US011923623B2

(12) United States Patent
Jin et al.

(10) Patent No.: US 11,923,623 B2
(45) Date of Patent: Mar. 5, 2024

(54) PATCH ANTENNA STRUCTURE, AN ANTENNA FEEDER PLATE AND A BASE STATION TRANSCEIVER

(71) Applicant: Samsung Electronics Co., Ltd., Suwon-si (KR)

(72) Inventors: Lukui Jin, Guangzhou (CN); Lei Cai, Guangzhou (CN); Bingjian Niu, Guangzhou (CN)

(73) Assignee: Samsung Electronics Co., Ltd., Suwon-si (KR)

(*) Notice: Subject to any disclaimer, the term of this patent is extended or adjusted under 35 U.S.C. 154(b) by 433 days.

(21) Appl. No.: 17/280,490

(22) PCT Filed: Nov. 9, 2018

(86) PCT No.: PCT/KR2018/013631
§ 371 (c)(1),
(2) Date: Mar. 26, 2021

(87) PCT Pub. No.: WO2020/096093
PCT Pub. Date: May 14, 2020

(65) Prior Publication Data
US 2022/0029295 A1 Jan. 27, 2022

(51) Int. Cl.
*H04B 1/38* (2015.01)
*H01Q 1/24* (2006.01)
*H01Q 1/42* (2006.01)
*H01Q 9/04* (2006.01)

(52) U.S. Cl.
CPC ........... *H01Q 9/0407* (2013.01); *H01Q 1/246* (2013.01); *H01Q 1/42* (2013.01)

(58) Field of Classification Search
CPC ...... H01Q 1/405; H01Q 1/424; H01Q 9/0407; H01Q 1/246; H01Q 1/42; H01Q 1/12; H01Q 1/36
See application file for complete search history.

(56) References Cited

U.S. PATENT DOCUMENTS 5,400,040 A * 3/1995 Lane ...................... H01Q 1/286 343/822
7,079,078 B2 * 7/2006 Yuanzhu ................... H01P 9/04 343/789
8,334,809 B2 * 12/2012 Nichols ................ H01Q 1/3275 343/700 MS (Continued)

FOREIGN PATENT DOCUMENTS

CN 107546481 A 1/2018
JP 2008-219627 A 9/2008
JP 2011-517915 A 6/2011

*Primary Examiner* — Tuan Pham
(74) *Attorney, Agent, or Firm* — Jefferson IP Law, LLP

(57) ABSTRACT

A patch antenna structure is disclosed. The patch antenna structure includes a radome; a metal substrate disposed on one side of the radome and kept at a distance from the radome, a side wall of the radome facing to the metal substrate connecting with a feeding patch, or a side wall of the metal substrate facing to the radome connecting with a feeding patch; an antenna radiating patch attached to a side wall of the radome facing to the metal substrate, wherein the antenna radiating patch is kept at a certain distance from the metal substrate to maintain the radio frequency characteristics of the patch antenna.

9 Claims, 3 Drawing Sheets

(56) References Cited

U.S. PATENT DOCUMENTS

| | | | | |
|---|---|---|---|---|
| 2013/0284485 | A1* | 10/2013 | Wang | H01Q 9/28 174/105 R |
| 2016/0211581 | A1 | 7/2016 | Sampo et al. | |
| 2018/0219281 | A1 | 8/2018 | Sudo et al. | |

* cited by examiner

PATCH ANTENNA STRUCTURE, AN ANTENNA FEEDER PLATE AND A BASE STATION TRANSCEIVER

CROSS-REFERENCE TO RELATED APPLICATION(S)

This application is a National Phase Entry of PCT international Application No. PCT/KR2018/013631, which was filed on Nov. 9, 2018, the disclosure of which is incorporated herein by reference.

TECHNICAL FIELD

Embodiments of the present disclosure relate to communication equipment, and more particularly to a patch antenna structure, an antenna feeder plate and a base station transceiver.

BACKGROUND ART

In the prior art, the base station antenna design schemes such as the antenna feeder board and the base station transceiver have the following technical defects due to unreasonable structure, for example:

The existing base station antenna design schemes are mostly separated, that is, the antennas are separately designed and processed, and then assembled with the radome. Thus, a certain gap must be left between the antenna and the radome to objectively increase the height of the antenna.

In addition, although there is artificial magnetic conductor technique capable of reducing the height of the base station antenna, this technique can only be used under narrowband condition, and in dual polarization applications, side effects of degrading port isolation and cross polarization may occur.

DISCLOSURE OF INVENTION

Technical Problem

The technical problem to be solved by the present invention is to provide a patch antenna structure, an antenna feeder board and a base station transceiver which can reduce the height of the antenna under the premise of ensuring the bandwidth of the antenna, optimize the whole structure and reduce the volume of the product.

Solution to Problem

To achieve above-mentioned object of the claimed invention, a patch antenna structure comprising:

- a radome;
- a metal substrate disposed on one side of the radome and kept at a distance from the radome, a side wall of the radome facing to the metal substrate connecting with a feeding patch, or a side wall of the metal substrate facing to the radome connecting with a feeding patch;
- an antenna radiating patch attached to a side wall of the radome facing to the metal substrate, wherein the antenna radiating patch is kept at a certain distance from the metal substrate to maintain the radio frequency characteristics of the patch antenna.

Advantageously, the antenna radiating patch is integrally formed with the radome.

Advantageously, the radome has a slot on the side wall facing to the metal substrate for mounting the antenna radiating patch, the shape and depth of the slot are matched with the shape and height of the antenna radiating patch, and the antenna radiating patch is mounted in the slot.

Advantageously, the feeding patch protrudes from the side wall of the radome or the metal substrate.

A base station transceiver comprising a radio frequency digital assembly and an antenna filtering assembly connected to one side of the radio frequency digital assembly, the antenna filtering assembly includes an antenna feeder board kept at a certain distance from the radio frequency digital assembly, a dielectric filter disposed on one side of the antenna feeder board, the dielectric filter is respectively connected to the antenna feeder board and the radio frequency digital assembly, wherein the antenna feeder board includes:

- a radome;
- a metal substrate disposed on one side of the radome and kept at a distance from the radome, a side wall of the radome facing to the metal substrate connecting with a feeding patch, or a side wall of the metal substrate facing to the radome connecting with a feeding patch;
- an antenna radiating patch attached to a side wall of the radome facing to the metal substrate, wherein the antenna radiating patch is kept at a certain distance from the metal substrate to maintain the radio frequency characteristics of the patch antenna.

Advantageously, the dielectric filter is mounted on a side of the metal substrate facing to the radio frequency digital assembly.

Advantageously, the radio frequency digital assembly includes a radio frequency digital unit and a power source, and the dielectric filter is connected to the radio frequency digital unit through a connector.

Advantageously, the radome has a slot on the side wall facing to the metal substrate for mounting the antenna radiating patch, the shape and depth of the slot are matched with the shape and height of the antenna radiating patch, and the antenna radiating patch is mounted in the slot.

Advantageously, the antenna radiating patch is integrally formed with the radome.

An antenna feeder board comprising above-mentioned patch antenna structure.

Performing the patch antenna structure, the antenna feeder plate and the base station transceiver of the present invention will bring out the following beneficial effects:

Firstly, the antenna radiating patch is attached to the side wall of the radome facing to the metal substrate, so that the antenna radiating patch is located on the inner side of the radome. Besides the antenna radiating patch is protected by the radome, the problem of excessive product volume due to the gap between the radome and the antenna radiating patch can be eliminated.

Secondly, since the antenna radiating patch keeps a certain distance from the metal substrate, the radio frequency characteristics such as the broadband of the patch antenna can be kept substantially unchanged, but the height can be significantly reduced.

Thirdly, the reduction in the height dimension of the patch antenna structure enables miniaturization of the entire base station transceiver, and the result of miniaturization of other passive components, for example, enables the whole structure to be further optimized.

MODE FOR THE INVENTION

The technical solutions in the embodiments of the present invention are clearly and completely described in the following with reference to the drawings in the embodiments of the present invention. It is obvious that the described embodiments are only a part of the embodiments of the present invention, and not all of the embodiments. All other embodiments obtained by those skilled in the art based on the embodiments of the present invention without creative efforts are within the scope of the present invention.

Figure 1:
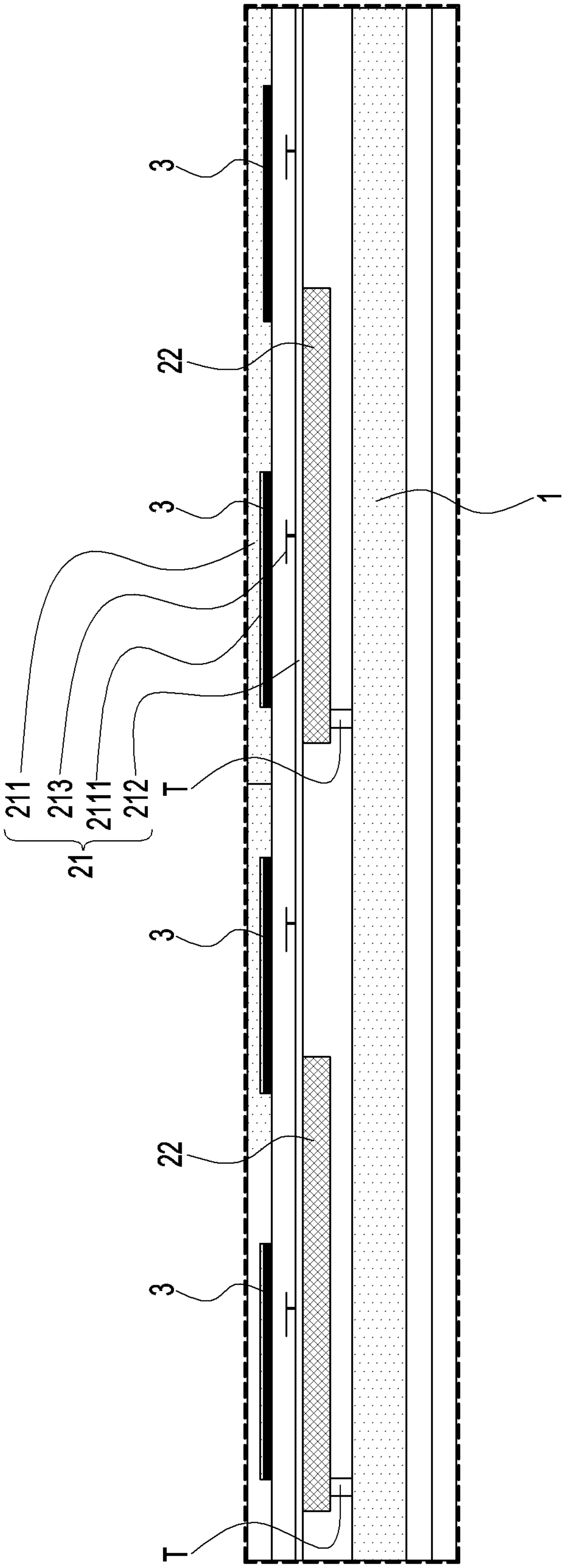
FIG. 1 is a schematic assembly cross-sectional structural view of a base station transceiver according to an embodiment of the present invention.
Figure 2:
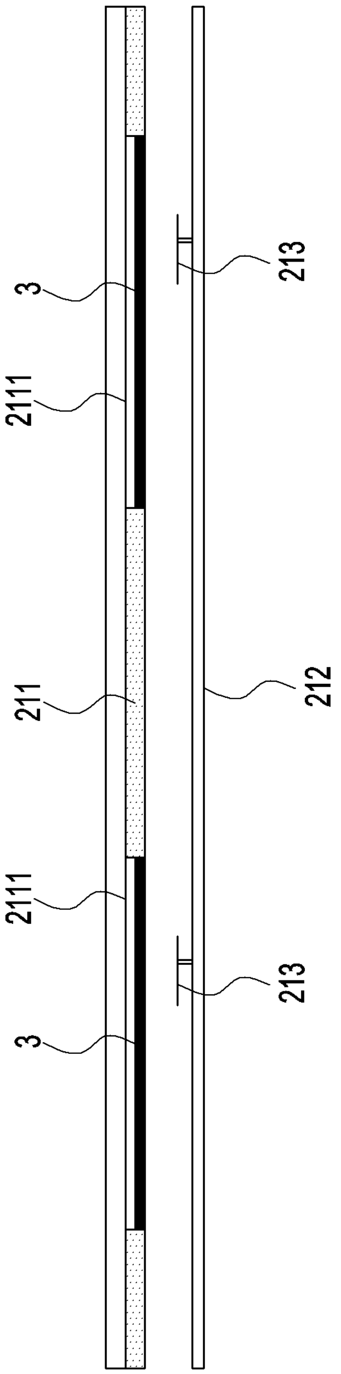
FIG. 2 is a schematic assembly cross-sectional structural view of a patch antenna structure according to a first embodiment of the present invention.

Referring to FIG. 1 and FIG. 2, a first embodiment of a base transceiver station of the present invention is shown.

The base station transceiver in this embodiment includes: a radio frequency digital assembly 1 and an antenna filtering assembly 2 connected to one side of the radio frequency digital assembly 1, the antenna filtering assembly 2 includes: an antenna feeder board 21 kept at a certain distance from the radio frequency digital assembly 1, a dielectric filter 22 disposed on one side of the antenna feeder board 21, the dielectric filter 22 is respectively connected to the antenna feeder board 21 and the radio frequency digital assembly 1, wherein the antenna feeder board 21 includes: a radome 211, a metal substrate 212 disposed on one side of the radome 211 and kept at a certain distance from the radome 211, a feeding patch 213 connected to the side wall of the metal substrate 212 facing to the radome 211, and an antenna radiating patch 3 attached to the side wall of the radome 211 facing to the metal substrate 212, wherein the antenna radiating patch 3 is kept at a certain distance from the metal substrate 212 for maintaining the radio frequency characteristics of the antenna radiating patch 3.

In a specific implementation, the radio frequency digital assembly 1 is an active part of the base station transceiver, and includes: a radio frequency digital unit and a power source. The radio frequency digital assembly 1 including the radio frequency digital unit and the power source in this embodiment is a flat plate structure, and the structure is easy to assemble and is easy to realize miniaturization of the product.

Further, the antenna filtering assembly 2 is disposed adjacent to the radio frequency digital assembly 1 as a passive part of the base station transceiver, and the antenna filtering assembly 2 includes an antenna feeder board 21 and a dielectric filter 22, wherein the antenna feeder board 21 is a flat plate which is disposed in parallel with the flat-plate radio frequency digital assembly 1 and keeps a certain distance from the antenna feeder board 21. The dielectric filter 22 is disposed between the antenna feeder board 21 and the radio frequency digital assembly 1 and is respectively connected to the antenna feeder board 21 and the radio frequency digital assembly 1.

The dielectric filter 22 is in the form of a thin block having one side surface attached to a side surface of the metal substrate 212 of the antenna feeder board 21 facing to the radio frequency digital assembly 1, and the other side of the dielectric filter 22 connect with the radio frequency digital assembly 1 through the connector T. The dielectric filter 22 in this embodiment is disposed as two blocks that are evenly arranged, and are respectively mounted between the antenna feeder board 21 and the radio frequency digital assembly 1 in accordance with the above-described connection mode.

The antenna feeder board 21 includes a radome 211, and a metal substrate 212 disposed at one side of the radome 211 and kept at a certain distance from the radome 211. In the embodiment, the radome 211 and the metal floor 212 are both thin plates and keep parallel with each other.

Further, the feeding patches 213 are connected to the side wall of the metal substrate 212 facing to the radome 211. The feeding patches 213 are provided in plurality and uniformly arranged, and the feeding patches 213 are protruded from the side wall of the metal substrate 212.

What the benefit that the antenna radiating patch 3 is attached to the side wall of the radome 211 facing to the metal substrate 122 is to eliminate the gap between the antenna radiating patch 3 and the radome 211, so that the whole antenna is still under the protection of the radome 211, further reducing the height of the antenna and meeting the structural performance requirements.

In a preferred embodiment, the radome 211 has a slot 2111 for mounting the antenna radiating patch 3 on the side wall facing to the metal substrate 212. The shape and depth of the slot 2111 are matched with the shape and height of the antenna radiating patch 3. The antenna radiating patch 3 is mounted in the slot 2111. In this way, the problem of the gap between the antenna radiation patch 3 and the radome 211 can be better solved.

Compared to the antenna structure having a gap between the conventional antenna radiating patch 3 and the radome 211, in the above embodiment, since the antenna radiating patch 3 is kept at a certain distance from the metal substrate 212, the distance from the antenna radiating patch 3 to the metal substrate 212 remains unchanged, so that the radio frequency characteristics such as the broadband frequency of the antenna remain substantially unchanged, but the height of the antenna can be significantly reduced.

In the preferred embodiment, the antenna radiating patch 3 is integrally formed with the radome 211, so that the gap between the antenna radiating patch 3 and the radome 211 can be completely eliminated, thereby greatly simplifying the assembly process and also facilitating cost control.

Figure 3:
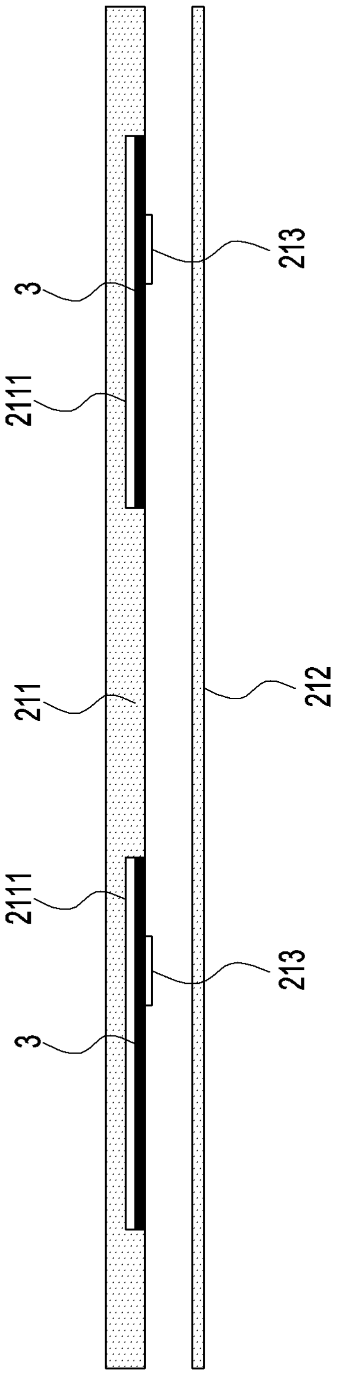
FIG. 3 is a schematic assembly cross-sectional structural view of a patch antenna structure according to a second embodiment of the present invention.

In another embodiment of the base station transceiver of the present invention, as shown in FIG. 3, the positions of the feeding patches 213 are disposed on the side wall of the radome 211 facing to the metal substrate 212 according to actual use requirements. Specifically, one side wall of the radome 211 is convex to ensure coupling with the feeding circuit of the metal substrate 212. At this time, the feeding patches 213 cover the convex portion of the radome 211.

The base station transceiver in this embodiment can save a large area of the main board of the base station transceiver by assembling and interconnecting the dielectric filter 22 which is also greatly reduced in size and the height-optimized antenna feeder board 21. The whole structure of the base station transceiver is further optimized, and the structural division of other components is also facilitated, such as a more specific passive part and a more explicit active part.

The present invention also discloses an antenna structure, and the implementation manner of the antenna structure is the same as that of the antenna feeder board described above, and details are omitted here.

Performing the patch antenna structure, the antenna feeder plate and the base station transceiver of the present invention will bring out the following beneficial effects:

Firstly, the antenna radiating patch is attached to the side wall of the radome facing to the metal substrate, so that the antenna radiating patch is located on the inner side of the radome. Besides the antenna radiating patch is protected by the radome, the problem of excessive product volume due to the gap between the radome and the antenna radiating patch can be eliminated.

Secondly, since the antenna radiating patch keeps a certain distance from the metal substrate, the radio frequency characteristics such as the broadband of the patch antenna can be kept substantially unchanged, but the height can be significantly reduced.

Thirdly, the reduction in the height dimension of the patch antenna structure enables miniaturization of the entire base station transceiver, and the result of miniaturization of other passive components, for example, enables the whole structure to be further optimized.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. A patch antenna structure comprising:

a radome;

a metal substrate disposed on one side of the radome and kept at a distance from the radome, wherein a feeding patch is connected to a side wall of the radome facing to the metal substrate connecting, or a side wall of the metal substrate facing to the radome connecting; and an antenna radiating patch attached to a side wall of the radome facing to the metal substrate, wherein the antenna radiating patch is kept at a certain distance from the metal substrate, and wherein the radome has a slot on the side wall facing to the metal substrate for mounting the antenna radiating patch in the slot.

2. The patch antenna structure of claim 1, wherein the shape and depth of the slot are matched with the shape and height of the antenna radiating patch.

3. A base station transceiver comprising a radio frequency digital assembly and an antenna filtering assembly connected to one side of the radio frequency digital assembly, the antenna filtering assembly includes an antenna feeder board kept at a certain distance from the radio frequency digital assembly, a dielectric filter disposed on one side of the antenna feeder board, the dielectric filter is respectively connected to the antenna feeder board and the radio frequency digital assembly, wherein the antenna feeder board includes:

a radome;

a metal substrate disposed on one side of the radome and kept at a distance from the radome, wherein a feeding patch is connected to a side wall of the radome facing to the metal substrate, or a side wall of the metal substrate facing to the radome; and an antenna radiating patch attached to a side wall of the radome facing to the metal substrate, wherein the antenna radiating patch is kept at a certain distance from the metal substrate.

4. The base station transceiver of claim 3, wherein the dielectric filter is mounted on a side of the metal substrate facing to the radio frequency digital assembly.

5. The base station transceiver of claim 3, wherein the radio frequency digital assembly includes a radio frequency digital unit and a power source, and the dielectric filter is connected to the radio frequency digital unit through a connector.

6. The base station transceiver of claim 3, wherein the radome has a slot on the side wall facing to the metal substrate for mounting the antenna radiating patch, the shape and depth of the slot are matched with the shape and height of the antenna radiating patch, and the antenna radiating patch is mounted in the slot.

7. The base station transceiver of claim 6, wherein the antenna radiating patch is integrally formed with the radome.

8. An antenna feeder board comprising:

a radome;

a metal substrate disposed on one side of the radome and kept at a distance from the radome, wherein a feeding patch is connected to a side wall of the radome facing to the metal substrate, or a side wall of the metal substrate facing to the radome; and an antenna radiating patch attached to a side wall of the radome facing to the metal substrate, wherein the antenna radiating patch is kept at a certain distance from the metal substrate, and wherein the radome has a slot on the side wall facing to the metal substrate for mounting the antenna radiating patch in the slot.

9. The antenna feeder board of claim 8, wherein the shape and depth of the slot are matched with the shape and height of the antenna radiating patch.

* * * * *